(No Model.)
J. A. BLONDEL.
REGISTERING DEVICE FOR MEASURING FAUCETS.
No. 382,944. Patented May 15, 1888.
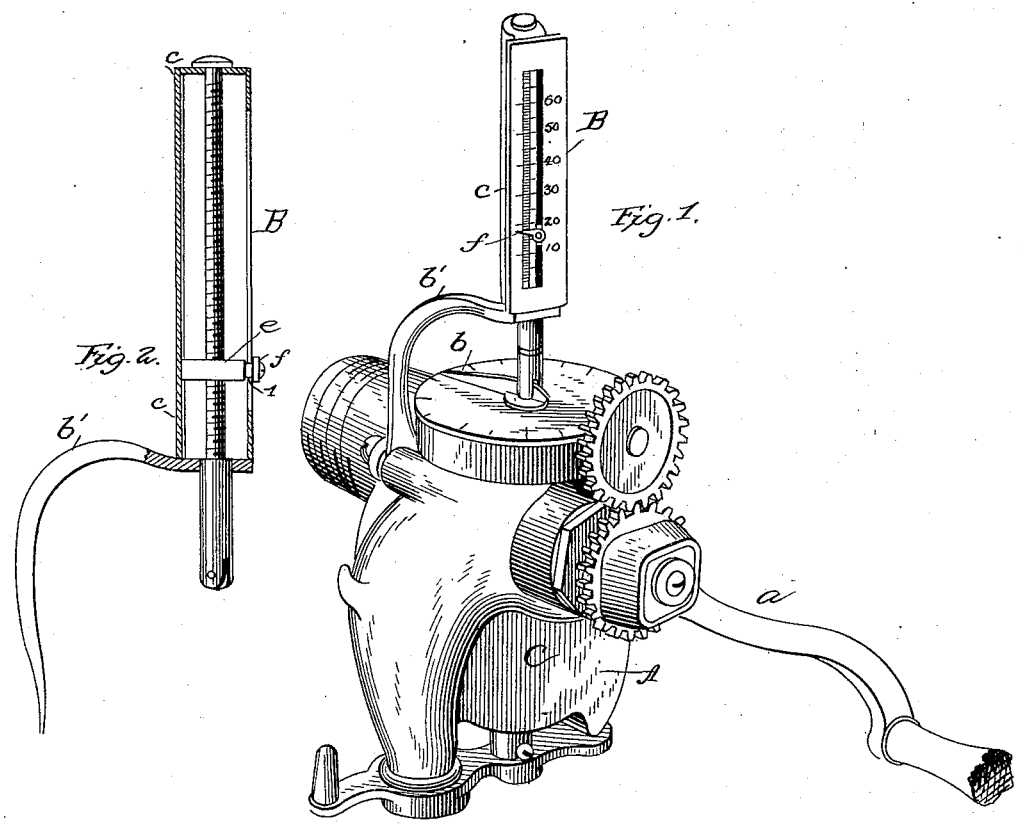

UNITED STATES PATENT OFFICE.

JULES ALFRED BLONDEL, OF SIOUX CITY, IOWA.

REGISTERING DEVICE FOR MEASURING-FAUCETS.

SPECIFICATION forming part of Letters Patent No. 382,944, dated May 15, 1888.

Application filed August 2, 1887. Serial No. 245,974. (No model.)

*To all whom it may concern:*

Be it known that I, JULES ALFRED BLONDEL, of Sioux City, in the county of Woodbury and State of Iowa, have invented a new and useful Improvement in Registering Devices for Measuring-Faucets; and I do hereby declare that the following is a full, clear, and exact description of the same.

My invention is an attachment for measuring-faucets; and its object is to register the amount of liquid drawn out, and thus to enable the merchant to ascertain at a glance how much of the liquid remains in the barrel where the full amount is known. By the use of this register, also, as the exact amount which passes through the faucet will be indicated when the barrel is emptied, the merchant can see whether or not the vessel contained the amount which he had paid for.

The invention consists in the devices and combination of devices hereinafter described, and in the details of construction of the register, whereby it is adapted to be connected with the index-finger of the measuring-faucet, and to register the amount of liquid drawn out by the successive revolutions of the piston in connection with the index-finger.

In the accompanying drawings I have represented in perspective, Figure 1, my invention as attached to what is commonly known as the "Enterprise Faucet;" but I do not desire to limit myself to the use of my invention with this faucet, as it may be applied without material change to any form of measuring-faucet. Fig. 2 is a section through the registering device.

In Fig. 1, A represents the faucet, which is composed of the usual measuring-chamber, C, and in this case it is provided with a circular chamber containing a piston which consists of radial arms, the spaces between the radial arms being capable of containing certain amounts. A suitable connection is made to the front of the faucet, and an operating-crank, $a$, is in connection therewith and adapted to turn the same, and the revolution of the shaft measures out the given amount which the chamber will hold. A gear-wheel is connected to the shaft or to the crank, as shown, and this is in connection with a gear mounted upon a shaft immediately above the first-mentioned shaft and a little to one side. The shaft of this second gear-wheel terminates in a worm, which meshes with a gear contained within a case, the spindle of said gear carrying an index-finger, (indicated at $b$.) The top of the case is provided with graduated points, indicating a pint, quart, and fractions thereof. As the operating-crank is in connection through the means described, it will be obvious that a revolution of the said crank which feeds the contents will cause the index-finger to indicate the amount drawn out, the connecting devices being proportioned so that the exact amount is indicated. As I have before explained, this is a well-known measuring-faucet, and indicates accurately the amount drawn out from time to time, and it is to such class of faucets that my invention is applicable. While an accurate amount may be drawn out at one time, such a faucet does not register the total amounts which have been drawn out, and this is very desirable for several reasons—first, because the merchant will then know just how much has been taken from the vessel, and may thus replenish whenever the contents get low, and at any time he may take an inventory of his stock in this line by simply glancing at the register, and, finally, when the barrel is entirely emptied, he can ascertain from his register whether or not it contained the amount which he paid for.

My register is shown at B, and it is shown as secured to the faucet by means of the bracket $b'$, bent as shown, so as to support the register and its revolving spindle directly over the center of the index-finger of the faucet. The revolving spindle is fitted in a case, $c$, having bearings at its upper and lower ends, as shown, and closed upon all sides by the case, with an index-plate upon the front. The spindle is screw-threaded for its length within the case, and is in engagement with a screw-threaded traveling block, $e$. A pointer, $f$, is provided, and this is secured to the block, as shown, by means of a rib, 1, passing through a slot, which runs nearly the extent of the index-plate, and this pointer indicates upon a graduated scale the number of gallons drawn out, as hereinafter more fully described. The lower end of the spindle is bifurcated, as shown, and this fits over the projecting flange of the index-finger of the faucet, and it may be held more securely in place by passing a pin through the spindle and the flange of the index-finger. In other forms of faucets, of course, this connection may be varied. It will thus be seen that the revolution of the index-finger of the faucet will communicate its motion to the spindle, and the revolution of the spindle will cause the sliding block to move up, and thereby indicate the amount which is drawn out.

It will be understood that the graduated scale may be arranged so that a given amount indicated by the index-finger of the faucet will be likewise indicated by the finger of the register, and successive operations of the faucet will be likewise registered, and so on until the vessel is empty, when an accurate register of the number of gallons which it contained will be found indicated.

I claim as my invention—

In combination with a measuring-faucet, a register adapted for connection therewith, consisting of the revolving spindle having a bifurcated end for connection with the index-finger of said faucet, a case for inclosing the same, a traveling block in connection with said spindle, an index-finger carried thereby, and a suitable dial, substantially as described.

In testimony whereof I have signed my name to this specification in the presence of two subscribing witnesses.

JULES ALFRED BLONDEL.

Witnesses:
    DANIEL H. SULLIVAN,
    GEO. H. ALLARD.